(12) United States Patent
Borufka et al.

(10) Patent No.: US 9,074,479 B2
(45) Date of Patent: Jul. 7, 2015

(54) DAMPING ELEMENT AND METHOD FOR DAMPING ROTOR BLADE VIBRATIONS, A ROTOR BLADE, AND A ROTOR

(75) Inventors: Hans Peter Borufka, Starnberg (DE); Andreas Hartung, Munich (DE); Patrick Prokopczuk, Munich (DE); Frank Stiehler, Bad Liebenwerda (DE)

(73) Assignee: MTU Aero Engines GmbH, Munich (DE)

( * ) Notice: Subject to any disclaimer, the term of this patent is extended or adjusted under 35 U.S.C. 154(b) by 770 days.

(21) Appl. No.: 13/087,674

(22) Filed: Apr. 15, 2011

(65) Prior Publication Data

US 2011/0255973 A1    Oct. 20, 2011

(30) Foreign Application Priority Data

Apr. 16, 2010   (DE) .......................... 10 2010 015 211

(51) Int. Cl.
   *F01D 5/26*   (2006.01)
   *F01D 5/08*   (2006.01)
   *F01D 5/02*   (2006.01)

(52) U.S. Cl.
   CPC  *F01D 5/082* (2013.01); *F01D 5/26* (2013.01); *F01D 5/027* (2013.01); *Y02T 50/671* (2013.01); *Y02T 50/676* (2013.01); *F05D 2240/126* (2013.01); *F05D 2300/212* (2013.01)

(58) Field of Classification Search
   CPC ............ F01D 5/26; F01D 25/04; F01D 25/06
   USPC .................................. 416/193 A, 219 R, 500
   See application file for complete search history.

(56) References Cited

U.S. PATENT DOCUMENTS

| 3,037,741 A | | 6/1962 | Tuft |
| 3,181,835 A | * | 5/1965 | Davis ............................ 416/145 |
| 3,751,183 A | * | 8/1973 | Nichols et al. ............. 416/220 R |
| 4,347,040 A | * | 8/1982 | Jones et al. ................... 416/190 |
| 4,568,247 A | * | 2/1986 | Jones et al. ................... 416/190 |

FOREIGN PATENT DOCUMENTS

| DE | 30 08 890 A1 | 9/1980 |
| DE | 40 15 206 C1 | 10/1991 |
| EP | 0 511 022 B1 | 10/1992 |
| EP | 1 944 466 A1 | 7/2008 |

* cited by examiner

*Primary Examiner* — Richard Edgar
(74) *Attorney, Agent, or Firm* — Crowell & Moring LLP

(57) ABSTRACT

A damping system for damping vibrations of a rotor blade of a rotor of a turbomachine is disclosed. A damping element is guided on a support such that the damping element is radially outwardly movable during a rotation of the rotor and is contactable with a lower platform area of a rotor blade. A circumferential contact surface is formed by an elevation on the lower platform area, where the circumferential contact surface is a limit stop for a movement of the damping element.

7 Claims, 6 Drawing Sheets

DAMPING ELEMENT AND METHOD FOR DAMPING ROTOR BLADE VIBRATIONS, A ROTOR BLADE, AND A ROTOR

BACKGROUND AND SUMMARY OF THE INVENTION

This application claims the priority of German Patent Document No. 10 2010 015 211.0, filed Apr. 16, 2010, the disclosure of which is expressly incorporated by reference herein.

The invention relates to a damping element for damping rotor blade vibrations of a turbomachine, a rotor blade having this type of damping system, a rotor having a plurality of these types of damped rotor blades and a method for damping rotor blade vibrations of a rotor of a turbomachine.

Rotor blades of gas turbines, such as aircraft engines, are frequently braced with one another within a blade ring via their shrouds to dampen vibrations. To this end, the shrouds have a Z-like design with two respective force transmitting surfaces for mutual mechanical coupling as shown in the Applicant's German Patent No. DE 40 15 206 C1. Even though this type of mechanical coupling is very effective, the shrouds are subjected to a relative high level of wear in the region of the force transmitting surfaces however.

In addition, bracing rotor blades with one another via a wire-like damping element, which is guided through the blade pans, is also known from European Patent Document No. EP 0 511 022 B1. However, the particular disadvantage of this solution is that the wire-like damping element is located in the flow path or annular space channel. This solution is not useable or useable only conditionally in the case of internally cooled blades in particular.

In addition, arranging damping elements in pockets of adjacent shrouds is known from European Patent Document No. EP 1 944 466 A1. When the rotor rotates, the damping elements are moved radially outwardly due to centrifugal force and thereby bring about a mechanical coupling of the shrouds. However, it is not possible to optimally adjust the damping of vibrations with this system.

Furthermore, using a damping system based on centrifugal force is known from U.S. Pat. No. 3,037,741, where the system's damping elements are arranged in a space between two neighboring rotor blades, which is limited in the radial direction by their platforms. The damping elements are displaceably guided respectively via a pin in a rotor bore in the radial direction and can thereby run against lower areas of the platforms during a rotation. However, due to their topology, these types of damping elements do not offer adequate damping of torsional modes of vibration in particular. In addition, the available structural design space is very limited so that the design and size of these damping elements do not meet their design and implementation requirements or only in a conditional manner.

German Patent Document No. DE 30 08 890 discloses a rotor for a gas turbine engine, which has a damping weight for damping purposes, which during rotation is pressed radially outwardly and engages frictionally on the inner surface of a platform.

The object of the present invention is creating a damping system for damping rotor blade vibrations of a turbomachine, a rotor blade with this type of damping system, and a rotor with a plurality of these types of damped rotor blades.

A damping system according to the invention for damping vibrations of a rotor blade of a rotor of a turbomachine, for example of an aircraft engine, has a damping element, which is guided on a rotor-side support in such a way that it executes a radially outwardly directed movement based on centrifugal force during a rotation of the rotor and can be brought into contact with a lower platform area of the rotor blade.

The damping system according to the invention allows a damping of critical modes of vibration of compressor and turbine run stages with and without a shroud, in a mounted designed or integral BLISK (bladed disk) or BLING (bladed ring) design, with or without blade cooling as well as with or without blade hollow spaces. The damping element is guided as a so-called rocking damper on the support such as, for example, a cover plate or a mini-cover plate on the rotor blade. Because of the rotation of the rotor, degrees of freedom of movement of the damping element based on a materializing centrifugal force field are utilized in such a way that a contact is produced on one or more defined couple contact points at least between the rotor blade and the damping element that is automatically reguided by the centrifugal force field. In this case, the mass of the damping element serves as an optimization parameter and to define switching points between a so-called "locked and slipping" state of the damping system.

The damping element may likewise execute movements in the circumferential direction of the rotor so that the damping element has degrees of freedom of movement that are as great as possible.

In the case of one exemplary embodiment, the damping element is mounted on the support by at least one connection element, which is guided into a radially extending longitudinal groove. In this case, the longitudinal groove is preferably designed in such a way that, when the damping element runs onto the lower platform area, the connection element is spaced apart from an opposing wall section of the longitudinal groove (as viewed in the movement direction of the damping element) and thereby released. In other words, the at least one connection element serves merely as a safeguard, and not however as a limit of the radial movement of the damping element. The limit is accomplished by the lower platform area of the blade.

In the case of another exemplary embodiment, the damping element has opposing sliding surfaces for guidance along two support-side, radially-extending guide surfaces. It is likewise conceivable for the damping element to be mounted on the support so it can be swiveled.

The danger of tilting can be further reduced if the damping element is configured to be U-shaped and grips around a head section of the support on both sides.

A circumferential contact surface formed by an elevation is preferably arranged in the lower platform area as a limit stop for the damping element. In addition, a frontal contact surface for producing a frictional contact between the damping element and the rotor blade may be provided. The exact position of the contact surfaces may be adjusted as a function of the respective mode of vibration so that an individualized contacting between the damping element and the rotor blade takes place and vibrations may be damped effectively. In the case of one exemplary embodiment, the contact surfaces are arranged, for example, symmetrically to the longitudinal surface of the damping element.

A rotor blade according to the invention for a turbomachine, for example of an aircraft engine, has at least one damping system with a damping element, which is guided on a rotor-side support in such a way that it executes an outwardly directed movement in the radial direction during a rotation of the rotor and can be brought into contact with a lower platform area of the rotor blade. The damping system may be arranged in the axial rotor direction in front, behind or on both sides, i.e., both upstream as well as downstream from the rotor blade.

A rotor according to the invention for a turbomachine has a plurality rotor blades arranged in blade rows, wherein damping elements are arranged on the rotor blades of at least one blade row, which damping elements are guided in such a way on a rotor-side support that they execute a movement in the radial direction due to centrifugal force and can be brought into contact with a lower platform area of the rotor blades. The damping elements dampen preferably flexural and torsional modes of vibration. In this case, a geometric adaptation of the contact geometry between the damping elements and the rotor blades may optimize or increase the damping effect on the mode of vibration characteristic.

In the case of a method according to the invention for damping vibrations of rotor blades of a turbomachine, for example of an aircraft engine, a damping element is respectively provided in a lower platform area of the rotor blades, which damping element is guided on the rotor-side support and moved against the respective lower platform area due to centrifugal force.

In the case of a preferred exemplary embodiment, the respective damping element rubs along a frontal contact surface of the rotor blades so that with a rotation the damper element is not just pressed on the lower platform area and in frictional contact therewith, but a mechanical damping also occurs through the dissipation of energy because of dry friction between the damping element and the vibrating frontal contact surfaces. As the case may be, a mechanical damping between the damper element and the support also occurs.

Preferred exemplary embodiments of the present invention will be explained in greater detail in the following on the basis of schematic representations.

DETAILED DESCRIPTION OF THE DRAWINGS

The same structural elements in the figures have the same reference numbers, wherein, in the event that there are several of the same structural elements in one figure, only one element is provided with the respective reference number for reasons of clarity.

Figure 1:
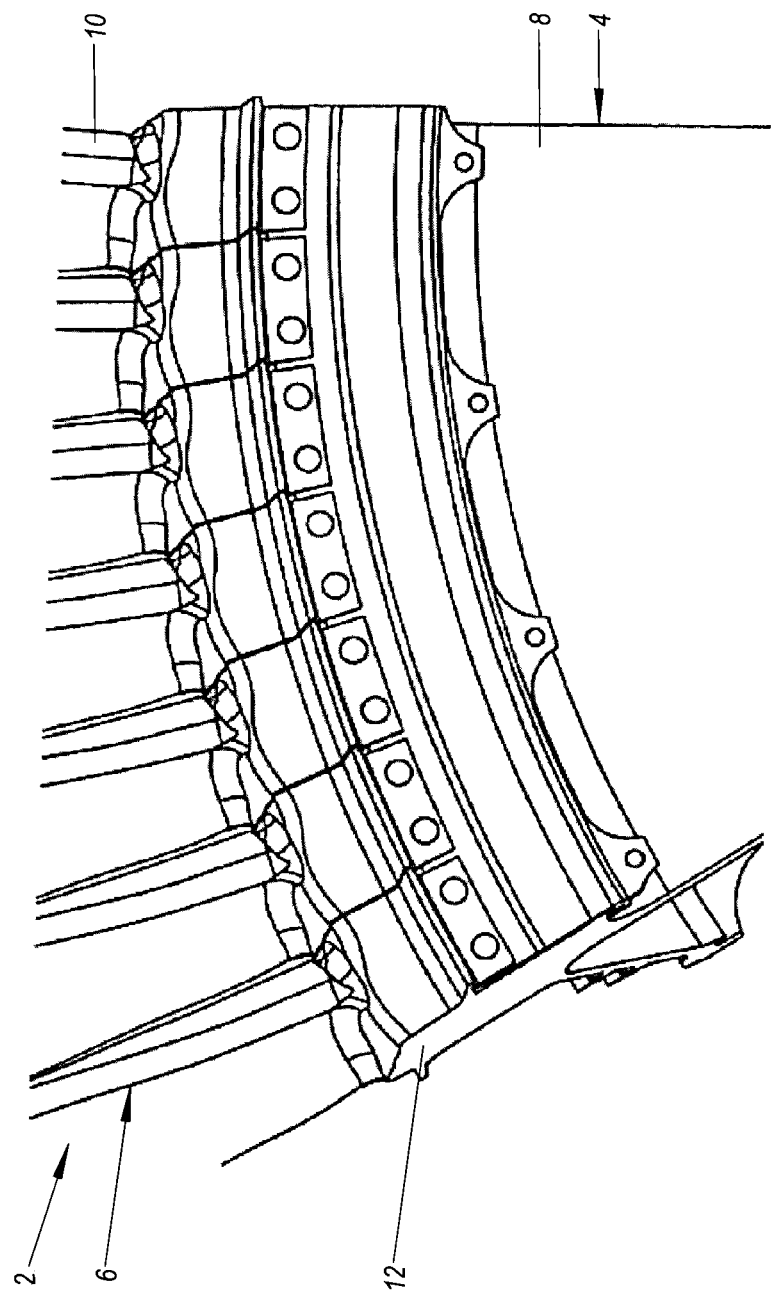
FIG. 1 is a perspective representation of a first damping system according to the invention.

FIG. 1 shows a perspective view of a section of a blade row 2 of a rotor disk 4 in the direction of flow. The blade row 2 is made of a plurality of rotor blades 6, which may be compressor or turbine blades of a stationary gas turbine or of an aircraft engine for example. They respectively have a disk land 8 integrally joined to the disk 4, a blade pan 10 as well as a broadened body section 12 arranged between the disk land 8 and the blade pan 10.

Figure 2:
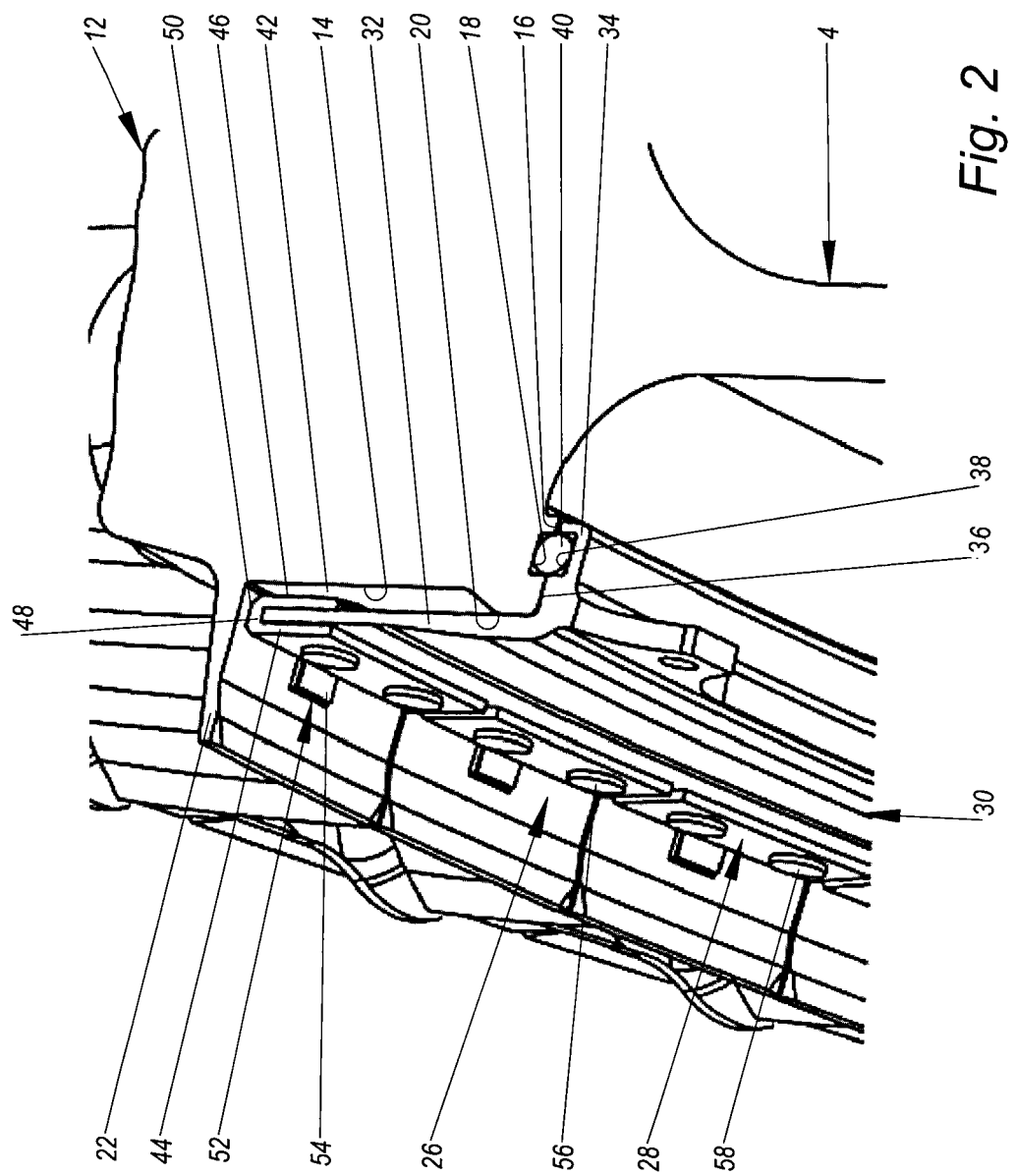
FIG. 2 is a detailed representation of the first damping system.

As FIG. 2 shows, the body section 12 has a front face 14 oriented opposite from the direction of flow, and a lower body surface 16 positioned almost at a right angle thereto, which points in the direction of a rotational axis (not shown) of the rotor disk 4 and is configured in a circumferential groove 18. In the edge region with the body surface 16, the face 14 has a ring end face 20 upstream in the axial direction. In the radial direction, the face 14 is limited by a front platform 22, which essentially serves to reduce flow losses and is arranged radially outwardly opposite from a rearward rear platform (not shown) in the region of the body section 12.

Arranged beneath the front platform 22, i.e., between the front platform 22 and an outer circumferential section (not shown) of the rotor disk 4, is a damping system 26 according to the invention, which has a plurality of damping elements 28, which are mounted spaced apart from one another and next to one another in the circumferential direction of the rotor disk 4 on a support 30 so they are movable in the radial direction and in the circumferential direction.

The support 30 extends over all rotor blades 6 of the blade row 2 and, in the depicted exemplary embodiment, features the design of an annular disk 32 with a radially inward axial projection 34, which extends almost at a right angle to or from this. The projection 34 in the depicted exemplary embodiment has a circumferential surface 36, by means of which it is situated adjacent to the body surface 16 of the body section 12 and in which a circumferential groove 38 is configured to form a hollow space with the circumferential groove 18 to accommodate a retaining ring 40. The annular disk 32 is situated adjacent to the ring end face 20 of the body section 12, whereby a gap 42 is formed between the annular disk 32 and the face 14.

In this case, the damping elements 28 have respectively, for example, a U-shaped design with two legs 44, 46 configured in the same manner, which are connected to one another via a connecting section 48. They respectively grip around a head section of the support 30 or the annular disk 32, wherein, in the depicted resting position, they rest with the connecting section 48 in the radial direction on the head section. With a rotation of the rotor disk 4, the damping elements 28 execute a radially outwardly aligned movement due to centrifugal force, wherein they run with an outer circumferential surface 50 (on the connecting-section side) onto a circumferential contact surface 54 formed by an elevation 52 on the respective front platform 22. The contact surface 54 is designed in accordance with the to-be-damped mode of vibration and positioned on the platform 22. Similarly, the geometry and the mass of the damping elements 28 are respectively adapted to the to-be-damped mode of vibration.

Figure 3:
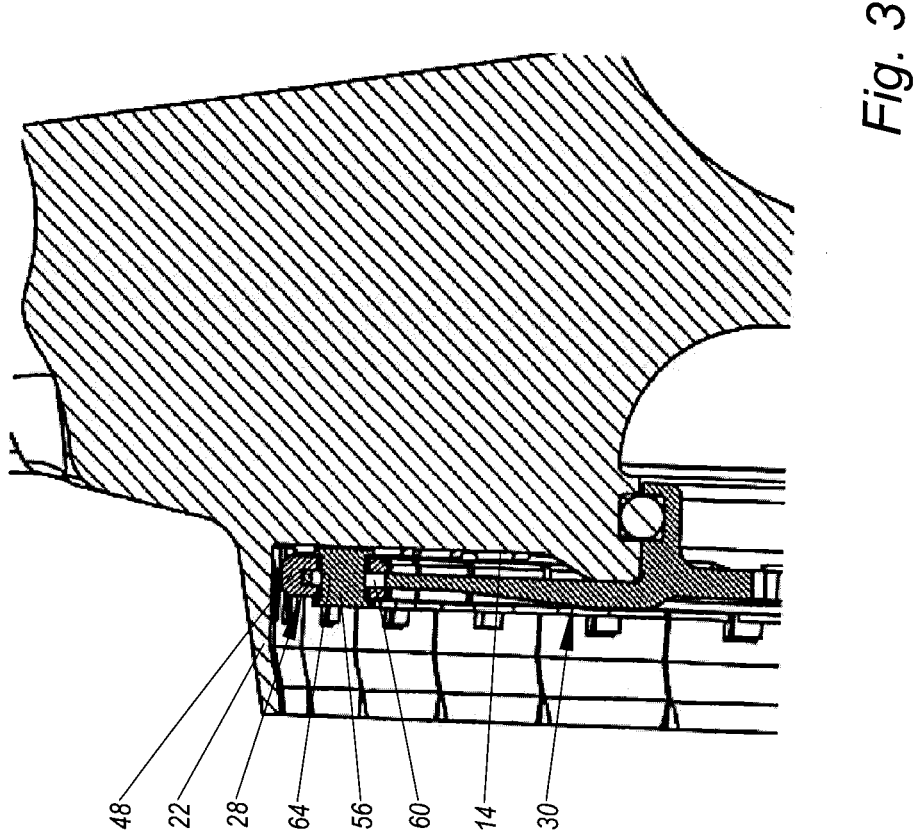
FIG. 3 is a cross-section through the first damping system.

The damping elements 28 are secured in a movable manner within limits on the support 30 in the radial as well as in the circumferential direction respectively via two rivet-like or bolt-like connection elements 56, 58, which, in accordance with FIG. 3, are respectively inserted through a pair of bores 60 (on the damping-element side) and guided into support-side radial longitudinal grooves 64. The pairs of bores 60 and the longitudinal grooves 64 in this case are configured with respect to one another in such a way that when the damping elements 28 run onto the lower platforms 22, the connection elements 56, 58 are released. In other words, the damping elements 28 do not support themselves in the radially disengaged position or in the operating position on the connection elements 56, 58, but are spaced apart from the connection elements. On the other hand, in the resting position the damping elements 28 support themselves via their respective connecting section 48 on the support 30 so that the connection elements 56, 58 are also released in the resting position. As a result, the connection elements 56, 58 in fact prevent the damping elements 28 from slipping in the circumferential direction outside the permissible limits.

Formed beneath the front platforms 22 in the region of the face 14 is an elevation (no reference number) for forming a frontal contact surface for the damping element 28, which elevation extends in the axial direction of the radially moving damping element 28 and is designed and positioned in accordance with the to-be-damped mode of vibration and can be provided with a coating to adjust the friction behavior. The frontal contact surface along with the circumferential contact surface 54 virtually forms an angle profile and is arranged symmetrically to the vertical axis of the respective damping element 28 in its resting position. Similarly, the connection elements 56, 58 or the longitudinal grooves 64 are arranged symmetrically to the vertical axis of the respective damping element 28 in its resting position so that a tilting or jamming of the damping elements 28 during a radial movement is effectively prevented.

In the case of a rotation of the rotor disk 4, the damping elements 28 are pressed outwardly on the circumferential contact surfaces 54 with their outer circumferential surfaces 50 due to centrifugal force. At the same time, the damping elements 28 rub with the leg 46 facing the front side 14 along the frontal contact surfaces 70 so that a precise mechanical damping of the respective rotor blade 6 and therefore the entire blade row 2 occurs through the dissipation of energy between the damper elements 28 and the vibrating contact surfaces 54, and as the case may be, also between the damper elements 28 and the support 30 per se.

Figure 4:
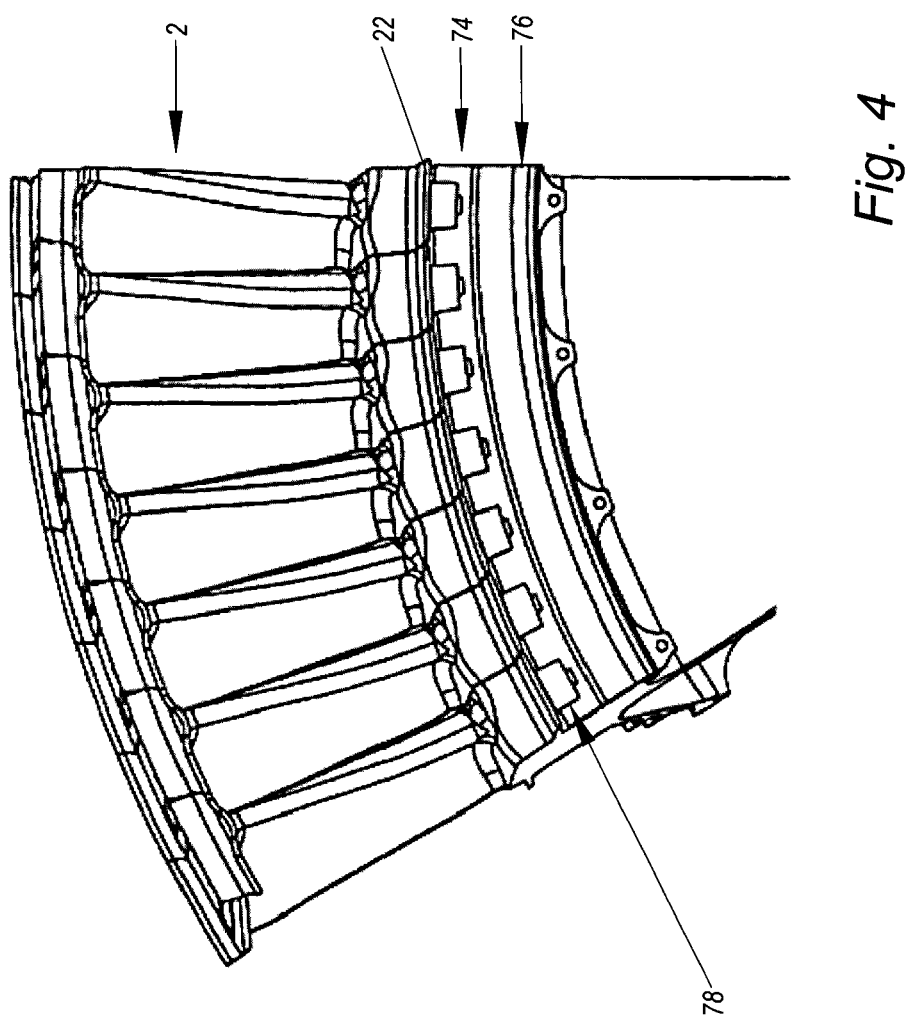
FIG. 4 is a perspective representation of a second damping system according to the invention.

FIG. 4 shows a second damping system 74 according to the invention for damping preferably flexural and torsional modes of vibration of a rotor blade row 2. The damping system 74 is based on the same operating principle as the previously described damping system 26 according to FIGS. 1 through 3. The essential difference between the two damping systems 26, 74 is in the guidance of their damping elements 28, 78 onto or upon the support 30, 76.

Figure 6:
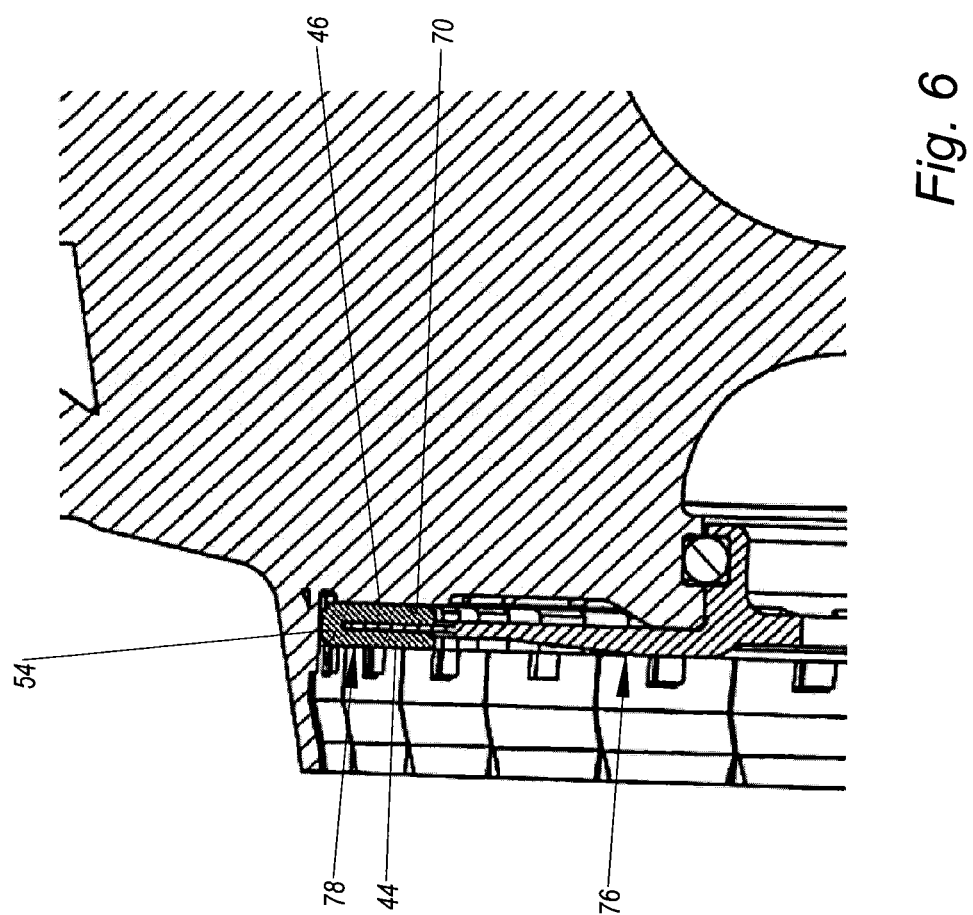
FIG. 6 is a cross-section through the second damping system.

The damping system 74 is arranged in a lower platform area 22 and has a blade-side support 76, on which a plurality of damping elements 78 arranged next to one another and spaced apart from one another are guided. The damping elements 78 are movable at least in the radial direction and each have a symmetrical U-shaped design for gripping around (in sections) a head section of the support 76 with two legs 44, 46 (FIG. 6).

Figure 5:
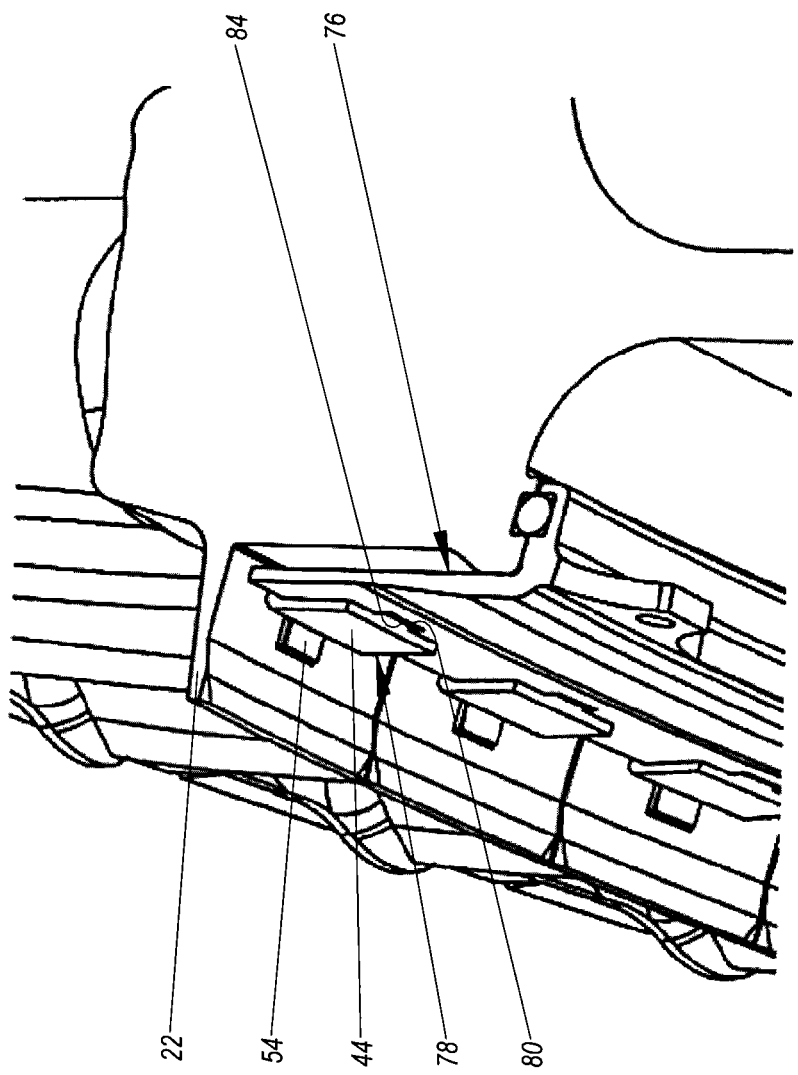
FIG. 5 is a detailed representation of the second damping element.

The guidance or securing of the damping elements 78 on the support 76 is accomplished as shown in FIG. 5 via two inside-mounted and opposing sliding surfaces 80 of their legs 44, 46, which are operatively engaged with correspondingly configured guide surfaces 84 of the support 76 that are stepped back against adjacent surface sections and extend in the radial direction.

In order to optimize the damping properties, as was the case with the previously described first damping system 26 according to FIGS. 1 through 3, a circumferential contact surface 54 and a frontal contact surface 70 (see FIG. 6) are respectively provided in the region beneath the front platforms 22, which contact surfaces form an angle profile and are arranged symmetrically to the guide or to the vertical axis of the damping elements 78 in the resting position.

In the case of a rotation of the rotor disk 4, the damping elements 78 are pressed on the circumferential contact surfaces 54 due to centrifugal force. At the same time, the damper elements 78 rub against this circumferential contact surface 54 as well as against the frontal contact surfaces 70 of the rotor blade 6 so that, among other things, a mechanical damping occurs through the dissipation of energy because of dry friction between the damping elements 78 and the vibrating contact surfaces 54, 70, and as the case may be, also between the damping elements 78 and the support 76.

A damping system for damping vibrations of a rotor blade of a rotor of a turbomachine is disclosed, whose damping element is guided on the blade-side in such a way that it executes a radially outwardly directed movement during a rotation of the rotor and can be brought into contact with a lower platform area of the rotor blade, a rotor blade with this type of damping system, a rotor with a plurality of these type of damping systems as well as a method for damping rotor blade vibrations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

2 Blade row
4 Rotor disk
6 Rotor blade
8 Disk land
10 Blade pan
12 Body section
14 Front face
16 Lower body surface
18 Circumferential groove
20 Ring end face
22 Front platform
26 Damping system
28 Damping element
30 Support
32 Annular disk/cover plate
34 Projection
36 Circumferential surface
38 Circumferential groove
40 Retaining ring
42 Gap
44 Leg
46 Leg
48 Connecting section
50 Outer circumferential surface
52 Elevation (friction surface)
54 Circumferential contact surface
56 Connection element
58 Connection element
60 Pair of bores
64 Longitudinal groove
70 Frontal contact surface
74 Damping system
76 Support
78 Damping element
80 Sliding surface
84 Guide surface

What is claimed is:

1. A damping system for damping vibrations of a rotor blade of a rotor of a turbomachine, comprising:
a lower platform area of a rotor blade;
a support;
a damping element guided on the support such that the damping element is radially outwardly movable during a rotation of the rotor and is contactable with the lower platform area and wherein the damping element is U-shaped and grips around the support; and a circumferential contact surface formed by an elevation on the lower platform area, wherein the circumferential contact surface is a limit stop for a movement of the damping element;

wherein an entirety of the damping system is arranged upstream or downstream from the rotor blade;

and wherein an entirety of the damping element is arranged radially under the rotor blade.

2. The damping system according to claim 1, wherein the turbomachine is an aircraft engine.

3. The damping system according to claim 1, wherein the damping element has opposing sliding surfaces and wherein the support has two guide surfaces, and wherein the opposing sliding surfaces are operatively engaged with the two guide surfaces.

4. The damping system according to claim 1, wherein the damping system is arranged on an upstream side or a downstream side of the rotor.

5. A damping system for damping vibrations of a rotor blade of a rotor of a turbomachine, comprising:
 a lower platform area of a rotor blade;
 a support;
 a damping element guided on the support such that the damping element is radially outwardly movable during a rotation of the rotor and is contactable with the lower platform area and wherein the damping element is U-shaped and grips around the support; and
 a circumferential contact surface formed by an elevation on the lower platform area, wherein the circumferential contact surface is a limit stop for a movement of the damping element;
 wherein the damping element is moveable in a circumferential direction and wherein an entirety of the damping element is arranged radially under the rotor blade.

6. A damping system for damping vibrations of a rotor blade of a rotor of a turbomachine, comprising:
 a lower platform area of a rotor blade;
 a support;
 a damping element guided on the support such that the damping element is radially outwardly movable during a rotation of the rotor and is contactable with the lower platform area; and
 a circumferential contact surface formed by an elevation on the lower platform area, wherein the circumferential contact surface is a limit stop for a movement of the damping element;
 wherein an entirety of the damping system is arranged upstream or downstream from the rotor blade;
 wherein an entirety of the damping element is arranged radially under the rotor blade;
 and wherein the damping element is mounted on the support by a connection element which is guided into a radially extending longitudinal groove of the support.

7. A damping system for damping vibrations of a rotor blade of a rotor of a turbomachine, comprising:
 a lower platform area of a rotor blade;
 a support;
 a damping element guided on the support such that the damping element is radially outwardly movable during a rotation of the rotor and is contactable with the lower platform area;
 a circumferential contact surface formed by an elevation on the lower platform area, wherein the circumferential contact surface is a limit stop for a movement of the damping element; and
 a frontal contact surface of the rotor blade and wherein the damping element is frictionally contactable with the frontal contact surface;
 wherein the damping element is U-shaped and grips around the support.

* * * * *